United States Patent
Jain et al.

(10) Patent No.: US 7,539,491 B2
(45) Date of Patent: May 26, 2009

(54) AUTHENTICATING BETWEEN A CDMA NETWORK AND A GSM NETWORK

(75) Inventors: Nikhil Jain, San Diego, CA (US); Bruce Collins, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 10/804,301

(22) Filed: Mar. 18, 2004

(65) Prior Publication Data

US 2004/0224667 A1 Nov. 11, 2004

Related U.S. Application Data

(60) Provisional application No. 60/455,909, filed on Mar. 18, 2003.

(51) Int. Cl.
*H04B 1/38* (2006.01)

(52) U.S. Cl. .................. 455/435.1; 455/411; 455/432.1

(58) Field of Classification Search ................. 455/410, 455/411, 422.1, 432.1, 432.3, 433, 435.1 455/435.2, 412.1, 552.1
See application file for complete search history.

(56) References Cited

U.S. PATENT DOCUMENTS

| | | | |
|---|---|---|---|
| 4,901,307 A | | 2/1990 | Gilhousen et al. |
| 5,675,629 A | * | 10/1997 | Raffel et al. ............ 455/552.1 |
| 5,887,251 A | | 3/1999 | Fehnel |
| 6,144,653 A | | 11/2000 | Persson et al. |
| 6,223,026 B1 | * | 4/2001 | Martschitsch ............ 455/407 |
| 6,298,232 B1 | | 10/2001 | Marin et al. |
| 6,320,873 B1 | * | 11/2001 | Nevo et al. .............. 370/466 |
| 6,564,055 B1 | | 5/2003 | Hronek |
| 6,681,111 B2 | | 1/2004 | Ahn et al. |
| 6,839,434 B1 | | 1/2005 | Mizikovsky |
| 6,853,729 B1 | | 2/2005 | Mizikovsky |
| 7,043,238 B2 | * | 5/2006 | Ahn et al. ............... 455/432.1 |

(Continued)

FOREIGN PATENT DOCUMENTS

AU 2003293525 7/2004

(Continued)

OTHER PUBLICATIONS

International Search Report - PCT/US04/008543 - International Search Authority, US - Jul. 12, 2005.

(Continued)

*Primary Examiner*—Sam Bhattacharya
(74) *Attorney, Agent, or Firm*—Albert J. Hamois; Won Tae C. Kim

(57) ABSTRACT

A general global gateway (GGG) permits authenticating between a CDMA network and a GSM network such that a mobile station having a subscription in a GSM network can roam into a CDMA network and be authenticated to use the CDMA network. The GGG obtains authentication parameters from the mobile station and determines whether the authentication parameters satisfy GGG authentication criteria. During the authentication process, the mobile station is placed in "SMS only" status until authorized by the GGG. Checks are made during the authentication process to assure the GGG and mobile station agree on the number of GSM network accesses and to assure the mobile station is authorized for GSM access for a time period.

20 Claims, 3 Drawing Sheets

U.S. PATENT DOCUMENTS

| | | |
|---|---|---|
| 7,343,490 B2 | 3/2008 | Le et al. |
| 2001/0044295 A1* | 11/2001 | Saito et al. .................. 455/410 |
| 2004/0003056 A1* | 1/2004 | Yamaguchi et al. .......... 709/219 |
| 2004/0116155 A1* | 6/2004 | Aisenberg ................... 455/558 |
| 2004/0133623 A1 | 7/2004 | Murtagh et al. |
| 2004/0137899 A1* | 7/2004 | Hartmaier ................ 455/432.2 |
| 2005/0143396 A1 | 6/2005 | Parthasaradhi et al. |
| 2005/0215245 A1* | 9/2005 | Tian et al. ................ 455/422.1 |
| 2006/0050680 A1* | 3/2006 | Naim et al. ................. 455/411 |

FOREIGN PATENT DOCUMENTS

| | | |
|---|---|---|
| RU | 2172077 | 8/2000 |
| RU | 2160975 | 12/2000 |
| WO | 01054435 | 7/2001 |
| WO | 02041641 | 5/2002 |

OTHER PUBLICATIONS

Written Opinion - PCT/US04/008543 - International Search Authority, US - Jul. 12, 2005.

International Preliminary Report on Patentability - PCT/US04/008543 - The International Bureau of WIPO, Geneva, Switzerland - Sep. 23, 2005.

* cited by examiner

AUTHENTICATING BETWEEN A CDMA NETWORK AND A GSM NETWORK

CROSS-REFERENCE TO RELATED APPLICATION

This application claims priority from U.S. Provisional Patent Application Ser. No. 60/455,909, filed Mar. 18, 2003.

REFERENCE TO CO-PENDING APPLICATIONS FOR PATENT

The present Application for Patent is related to the following co-pending U.S. Patent Applications:

"Internetworking Between A First Network And A Second Network" filed on Mar. 18, 2004, having Ser. No. 10/804,265, and "Using Shared Secret Data (SSD) To Authenticate Between A CDMA Network And A GSM Network," filed on Mar. 18, 2004, having Ser. No. 10/804267, assigned to the assignee hereof, and which are expressly incorporated by reference herein.

FIELD OF THE INVENTION

The present invention relates generally to wireless communication systems, and more particularly to systems that permit authenticating between a CDMA network and a GSM network.

BACKGROUND

Code division multiple access (CDMA) is a digital wireless technology that inherently has relatively greater bandwidth capacity, i.e., that inherently permits the servicing of more telephone calls per frequency band, than other wireless communication technologies. Moreover, the spread spectrum principles of CDMA inherently provide secure communications. U.S. Pat. No. 4,901,307, incorporated herein by reference, sets forth details of a CDMA system, which can be used to transmit both voice calls and non-voice computer data.

Despite the advantages of CDMA, other wireless systems exist that use other principles. For example, in much of the world GSM is used, which employs a version of time division multiple access.

Whether CDMA principles or other wireless principles are used, wireless communication systems can be thought of as having two main components, namely, the wireless radio access network (RAN) and the core infrastructure which communicates with the RAN and with external systems, such as the public switched telephone network (PSTN), the Internet (particularly although not exclusively for data calls), etc. The core infrastructures associated with the various wireless technologies can be very expensive, both in terms of hardware and in terms of developing communication protocols to support particularized, typically system-specific call switching, subscription and attendant authentication and call monitoring, and billing. Consequently, the communication protocols of one wireless system (in the case of GSM, GSM protocols, and in the case of CDMA such as cdma2000-1x, IS41 protocols) may not be compatible with those of another system without expensively prohibitive alterations in the core infrastructure of one system or the other.

It would be desirable to authenticate between a CDMA network and a GSM network, thereby enabling the use of a CDMA-based RAN, with its attendant advantages, and enabling the use of a GSM-based core infrastructure, since GSM is extant in much of the world.

Thus, a dual-mode mobile station may be enabled to advantageously interface with a GSM core infrastructure when in, e.g., Europe, and to use a CDMA infrastructure when in, e.g., the United States.

SUMMARY OF THE INVENTION

In one aspect of the present invention, a general global gateway (GGG) is configured to support communication between a GSM network and a CDMA network to enable a mobile station (MS) subscribed in the GSM network to communicate using the CDMA network, comprising a database configured to store a number of times the mobile station has accessed the GGG, and a logic unit configured to execute program logic to determine whether a parameter received from the mobile station, the parameter representing a count of a predetermined event that is a mutually agreed upon event between the GGG and mobile station.

In another aspect of the invention, a general global gateway (GGG) is configured to support communication between a GSM network and a CDMA network to enable a mobile station (MS) subscribed in the GSM network to communicate using the CDMA network, comprising means for storing a number of times the mobile station has accessed the GGG, and means for executing program logic to determine whether a parameter received from the mobile station, the parameter representing the number of times the mobile station has accessed the GGG, is equal to the stored number of times the mobile station has accessed the GGG.

In yet another aspect of the present invention, a method of wireless communications between a GSM network and a CDMA network to enable a mobile station (MS) subscribed in the GSM network to communicate using the CDMA network, comprises storing a number of times the mobile station has accessed a general global gateway (GGG), and determining whether a parameter received from the mobile station, the parameter representing the number of times the mobile station has accessed the GGG, is equal to the stored number of times the mobile station has accessed the GGG.

In a further aspect of the present invention, computer readable media embodying a program of instructions executable by a computer program to perform a method of wireless communications between a GSM network and a CDMA network enabling a mobile station (MS) subscribed in the GSM network to communicate using the CDMA network, the method comprises storing a number of times the mobile station has accessed a general global gateway (GGG), and determining whether a parameter received from the mobile station, the parameter representing the number of times the mobile station has accessed the GGG, is equal to the stored number of times the mobile station has accessed the GGG.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

Figure 1:
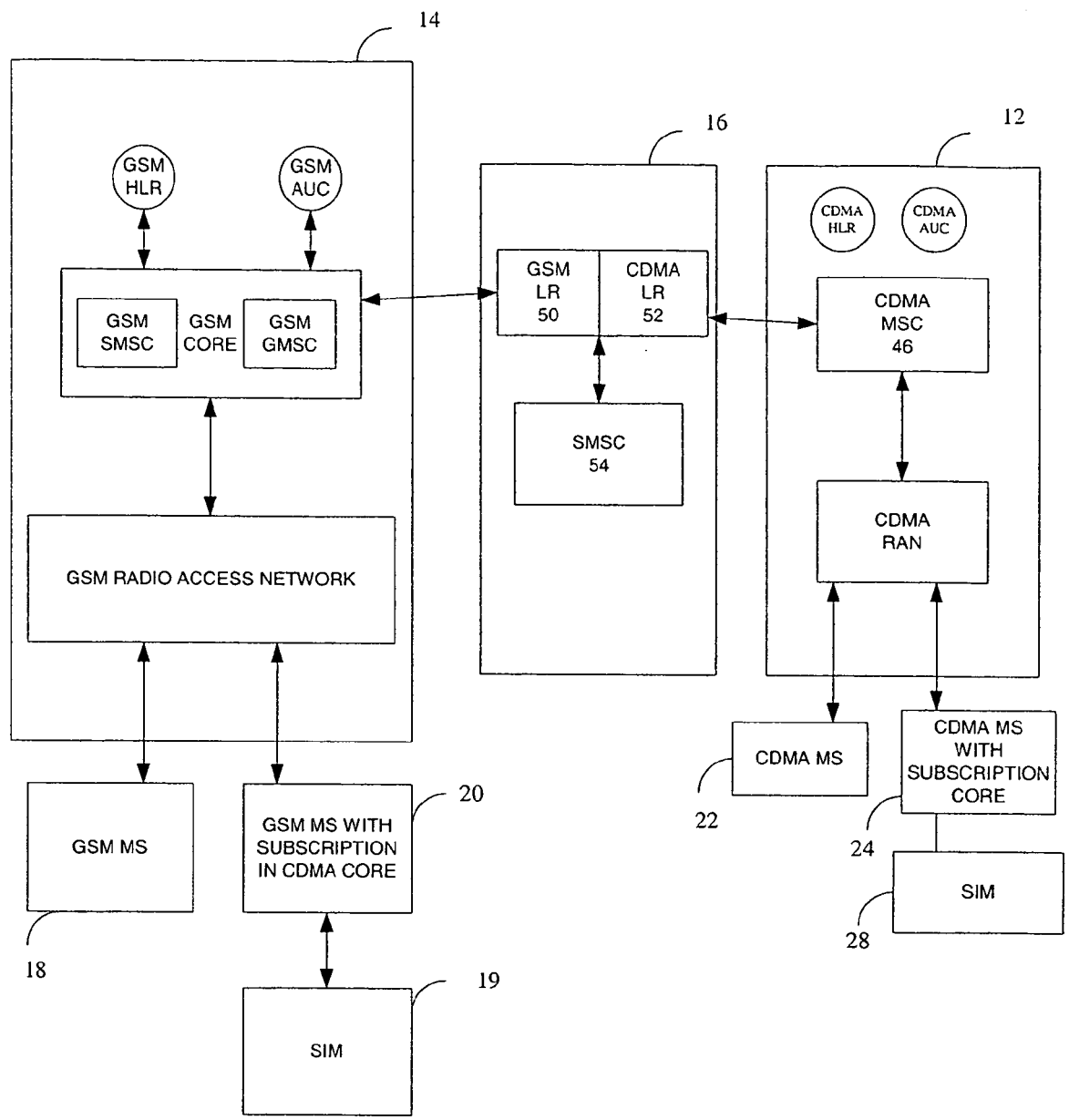
FIG. 1 shows a block diagram of a wireless communications system comprising a CDMA network, a GSM network, General Global Gateway (GGG), and mobile stations.

FIG. 1 shows a block diagram of a wireless communications system 10 comprising a CDMA network 12, a GSM network 14, General Global Gateway (GGG) 16, and mobile stations 18, 20, 22, 24. GSM mobile station 20 includes a Subscriber Identity Module (SIM) 26. CDMA mobile station 24 includes SIM 28. SIMs 26, 28 are removable engaged with mobile stations 20, 24, respectively, in accordance with principles known in the art. In an embodiment, the GGG is a GSM Global Gateway.

The GGG 16 internetworks between the CDMA network 12 and the GSM network 14. The GGG includes a transceiver (not shown) that allows it to send and receive messages to and from the CDMA network 12 and the GSM network 14.

In an embodiment, the CDMA network is an ANSI-41 network. It would be apparent to those skilled in the art, the CDMA network 12 may be any variety of CDMA networks including, but not limited to cdma2000-1x and cdma2000-1xEV-DO. It would also be apparent to those skilled in the art, the GSM network 14 may be any variety of GSM network or successor network including, but not limited to General Packet Radio Services (GPRS), Universal Mobile Telecommunication System (UMTS), and Wideband-CDMA (W-CDMA).

The GSM network 14 comprises a GSM Core 30 and a GSM Radio Access Network 32. The GSM Core 30 comprises a GSM Home Location Register (GSM HLR) 34, a GSM Authentication Center (GSM AuC) 36, a GSM Short Message Center (GSM SMSC) 38 and a GSM Gateway Mobile Switching Center (GSM GMSC) 40. The CDMA network 12 comprises a a CDMA Home Location Register (CDMA HLR) 42, a CDMA Authentication Center (CDMA AuC) 44, CDMA MSC 46 and associated CDMA Radio Access Network (CDMA RAN) 48.

With respect to a GSM mobile station with a subscription in a CDMA Core 20, the GGG 16 functions as a Visitor Location Register (VLR) 50 to the GSM network 14. With respect to a CDMA mobile station 24 with a subscription in a GSM Core 30, the GGG 16 functions as a Visitor Location Register (Visitor LR) 52 to the CDMA network 12.

Mobile stations 18, 20, 22, 24 do not need to have a subscription in both core infrastructures 12, 14 and may have a subscription in only one of the core infrastructures 12, 14.

With respect to both the GSM mobile station with a subscription in a CDMA Core 20 and a CDMA mobile station with a subscription in a GSM Core 24, the GGG 16 functions as a Short Message Service Center (SMSC) 54. It would be apparent to those skilled in the art that the GGG 16 can include or communicate with the SMSC 54.

Mobile stations 18, 20 support a GSM signaling protocol, a GSM Authentication procedure, and a GSM Short Message Service. Likewise, mobile stations 22, 24 support a CDMA signaling protocol, a CDMA Authentication procedure, and a CDMA Short Message Service.

During registration of a CDMA mobile station with a subscription in the GSM core 24, the GGG acts as an Authentication Controller in a CDMA network, but authenticates the mobile station 24 using the GSM authentication mechanism. Likewise, during registration of a GSM mobile station with a subscription in the CDMA core 20, the GGG acts as an Authentication Controller in a GSM network, but authenticates the mobile station 20 using the CDMA authentication mechanism.

The GGG acts as a message center via Short Message Service Center 54. In a CDMA network, SMS messages are routed to and from the mobile station 24 using a CDMA SMS mechanism. In other words, in a CDMA network, GSM messages are tunneled to and from mobile station 24 using a CDMA SMS mechanism. The GSM messages are encapsulated within CDMA SMS messages.

Likewise, in a GSM network, SMS messages are routed to and from the mobile station 20 using a GSM SMS mechanism. In other words, in a GSSM network, CDMA messages are tunneled to and from mobile station 20 using a GSM SMS mechanism. The CDMA messages are encapsulated within GSM SMS messages.

An incoming call to a registered GSM subscriber 24 arrives at GSM gateway MSC (GSM GMSC) 40 in the subscriber's home GSM network 14. The GMSC 40 interrogates the GSM LR 50 to determine the location of the subscriber 24, which is in the CDMA network 12. The location of the GSM subscriber 24 from the perspective of the GSM LR 50 is in the GGG 16, which appears as a GSM VLR. When the GSM LR 50 requests routing information from the GGG 16, the GGG 16 requests routing information from the serving CDMA LR 52 and thus the call is routed to the CDMA MSC 46.

Likewise, an incoming call to a registered CDMA subscriber 20 arrives at CDMA MSC 46 in the subscriber's home CDMA network 12. The CDMA MSC 46 interrogates the CDMA LR 52 to determine the location of the subscriber 20, which is in the GSM network 14. The location of the CDMA subscriber 20 from the perspective of the CDMA LR 52 is in the GGG 16, which appears as a CDMA VLR. When the CDMA LR 50 requests routing information from the GGG 16, the GGG 16 requests routing information from the serving GSM LR 50 and thus the call is routed to the GSM GMSC 40.

The CDMA-based mobiles stations 22, 24 communicate with a CDMA mobile switching center (MSC) 46 using a CDMA radio access network (RAN) 48 in accordance with CDMA principles known in the art. In an embodiment, the CDMA MSC 46 is an IS-41 MSC.

Likewise, the GSM-based mobiles stations 18, 20 communicate with a GSM mobile switching center (GSM GMSC) 40 using a GSM RAN 32 in accordance with GSM principles known in the art.

In accordance with CDMA principles known in the art, the CDMA RAN 48 includes base stations and base station controllers. In an embodiment, CDMA RAN 24 shown in FIG. 1 uses cdma2000, and specifically uses either cdma2000 1x, cdma2000 3x, or cdma2000 high data rate (HDR) principles.

In accordance with GSM principles known in the art, the GSM RAN 32 includes base stations and base station controllers. In an embodiment, GSM RAN 32 uses either GSM, GPRS, EDGE, UMTS, or W-CDMA principles.

The CDMA core infrastructure comprising the CDMA MSC 46 and CDMA RAN 48 can include or can access a CDMA authentication center (CDMA AUC) 44 and a CDMA home location register (CDMA HLR) 42 in accordance with CDMA principles known in the art to authenticate subscriber mobile station 22, and to collect accounting and billing information as required by the particular CDMA core infrastructure.

Likewise, the GSM core 30 can include or can access a GSM authentication center (GSM AUC) 36 and a GSM home location register (GSM HLR) 34 in accordance with GSM principles known in the art to authenticate subscriber mobile station 18, and to collect accounting and billing information as required by the particular GSM core infrastructure.

The CDMA MSC 46 uses the GGG 16 to communicate with the GSM network 14. The GSM network 14 can include or can access a GSM authentication center 36 and a GSM home location register (HLR) 34 in accordance with GSM principles known in the art to authenticate subscriber mobile station 24 and to collect accounting and billing information as required by the particular GSM core 30.

Likewise, GSM GMSC 40 uses the GGG 16 to communicate with the CDMA network 12. The CDMA network 12 can include or can access a CDMA authentication center 44 and a CDMA home location register (HLR) 42 in accordance with CDMA principles known in the art to authenticate subscriber mobile station 20 and to collect accounting and billing information as required by the particular CDMA network 12.

Both the GSM core 30 and the CDMA core infrastructure can communicate with a network such as a public switched telephone network (PSTN) and/or an Internet Protocol (IP) network.

With respect to a CDMA mobile station 24 with a subscription in a GSM Core 30, the GGG 16 functions as a VLR 50 to the GSM network 14. The GGG meets GSM protocol requirements for a VLR 50. The GGG interacts with GSM core network elements such as GSM HLR 34 and GSM SMSC 38 according to GSM specifications, except that the GGG 16 routes incoming calls to the CDMA network 12. The GSM LR 50 also performs a location update with the GSM network 14 when the mobile station registers in the CDMA network 12. In this sense, the GGG acts as a VLR to the whole CDMA network 12.

With respect to a GSM mobile station 20 with a subscription in a CDMA network 12, the GGG 16 functions as a VLR 52 to the CDMA network 14. The GGG meets CDMA protocol requirements for a VLR 52. The GGG interacts with CDMA core network elements such as CDMA HLR 42 and CDMA MSC 46 according to CDMA specifications, except that the GGG 16 routes incoming calls to the CDMA network 12. The CDMA LR 52 also performs a location update with the CDMA network 12 when the mobile station registers in the GSM network 14. In this sense, the GGG acts as a VLR to the whole GSM network 14.

When a mobile station that is in the CDMA network 12 is called from the GSM network 14, the call is routed to the CDMA LR 52 in the GGG 16 per standard specifications. The GGG 16 routes the call to the CDMA network 12. The CDMA network 12 eventually routes the call to the CDMA MSC 46 serving the mobile station. Similarly, if an SMS is routed to the CDMA network 12 from the GSM network 14, the GGG 16 routes the message to a message center (not shown) within the CDMA network 12.

When a mobile station that is in the GSM network 14 is called from the CDMA network 12, the call is routed to the GSM LR 50 in the GGG 16 per standard specifications. The GGG 16 routes the call to the GSM network 14. The GSM network 14 eventually routes the call to the GSM GMSC 40 serving the mobile station. Similarly, if an SMS is routed to the GSM network 10 from the CDMA network 12, the GGG 16 routes the message to a GSM SMSC 38 within the GSM network 14.

When a mobile station registers with the CDMA network 12, the CDMA network 12 sends a location update indication to the GSM network 14. The GSM LR 50 then performs a location update as per standard specifications with the GSM core network 14.

When a mobile station registers with the GSM network 14, the GSM network 14 sends a location update indication to the CDMA network 12. The CDMA LR 52 then performs a location update as per standard specifications with the CDMA network 12.

With respect to a CDMA mobile station 24 with a subscription in a GSM Core 30, the GGG 16 acts as an HLR 52 in the CDMA network 12. The CDMA LR 52 shall meet HLR protocol requirements for GSM to CDMA roaming. An important piece of information that the HLR 52 maintains is the address of the CDMA MSC 46 serving the mobile station 24. When the GSM LR 50 in the GGG 16 routes a call to the CDMA side 12, the CDMA LR 52 will further route it to the serving MSC 46.

With respect to a GSM mobile station 20 with a subscription in a CDMA network 12, the GGG 16 acts as an HLR 50 in the GSM network 14. The GSM LR 50 shall meet HLR protocol requirements for CDMA to GSM roaming. An important piece of information that the HER maintains is the address of the GSM GMSC 40 serving the mobile station 20. When the CDMA LR 52 in the GGG 16 routes a call to the GSM side 14, the GSM LR 50 will further route it to the serving MSC 40.

The GGG acts as an Authentication Controller (AUC) in the CDMA network for GSM subscribers 24. The AUC 44 in a CDMA network 12 is responsible for authenticating a mobile station and permitting/denying access to network resources. The AUC function in the GGG does not call for A-key provisioning at the GGG or the MS. Instead the GGG uses the GSM authentication credentials and the GSM authentication method via GSM signaling to authenticate the mobile station 24. The GGG responds to valid messages that can be received by a CDMA AUC 44.

The GGG acts as an Authentication Controller (AUC) in the GSM network for CDMA subscribers 20. The AUC 36 in a CDMA network 14 is responsible for authenticating a mobile station and permitting/denying access to network resources. The AUC function in the GGG does not call for A-key provisioning at the GGG or the MS. Instead the GGG uses the CDMA authentication credentials and the CDMA authentication method via CDMA signaling to authenticate the mobile station 20. The GGG responds to valid messages that can be received by a GSM AUC 36.

The GGG 16 acts as a Message Center (MC) in the CDMA network 12 and routes SMS messages between the CDMA mobile station 24 and GSM GMSC 40 using a GSM SMS mechanism.

Likewise, the GGG 16 acts as a Message Center (MC) in the GSM network 14 and routes SMS messages between the GSM mobile station 20 and CDMA MSC 46 using a CDMA SMS mechanism.

The CDMA MS 24 is required to have a valid identity in the CDMA network. If this identity is different from the GSM International Mobile Subscriber Identity (IMSI) (i.e., if the CDMA network does not use true IMSI), then the GGG provides a mapping between the CDMA identity and the GSM IMSI. It would be apparent to those skilled in the art that any technique/method known in the art to uniquely identify the mobile station 24 may be used.

The GSM MS 20 is required to have a valid identity in the GSM network. In an embodiment, this identity is a GSM IMSI (i.e., if the CDMA network does not use true IMSI). If the identity in the GSM network is different from the identity in a CDMA network, then the GGG provides a mapping between the GSM identity and the CDMA identity. It would be apparent to those skilled in the art that any technique/method known in the art to uniquely identify the mobile station 20 may be used.

In a non-limiting embodiment, mobile stations 18, 20, are mobile telephones made by Kyocera, Samsung, or other manufacturer that use GSM principles and GSM over-the-air (OTA) communication air interfaces. In a non-limiting embodiment, mobile stations 22, 24, are mobile telephones made by Kyocera, Samsung, or other manufacturer that use CDMA principles and CDMA over-the-air (OTA) communication air interfaces. The present invention, however, applies to other mobile stations such as laptop computers, wireless handsets or telephones, data transceivers, or paging and position determination receivers. The mobile stations can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

Figure 2A:
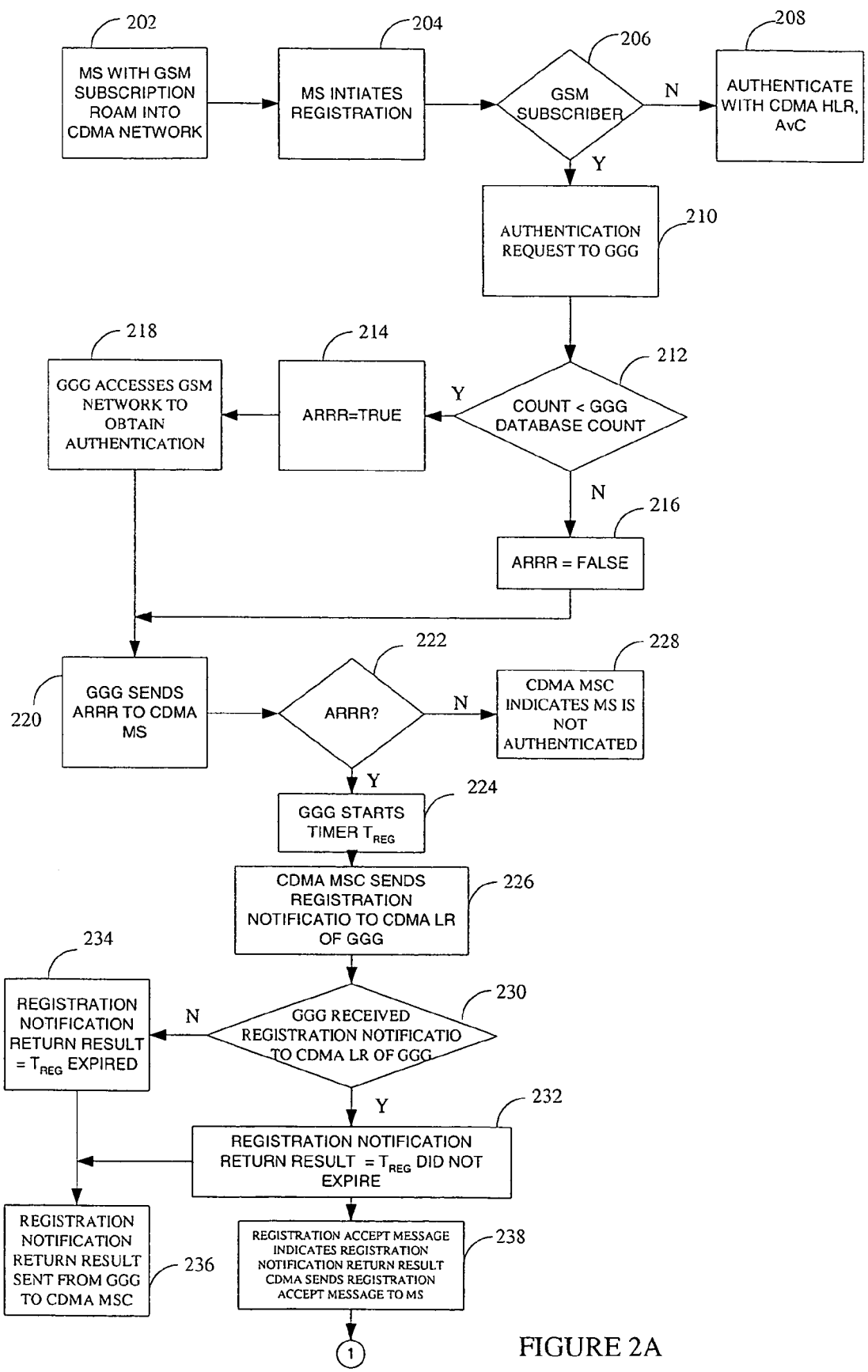
FIGS. 2a and 2b shows a flowchart for authenticating a CDMA mobile station 24 with a subscription in a GSM network 14 in accordance with an embodiment.
Figure 2B:
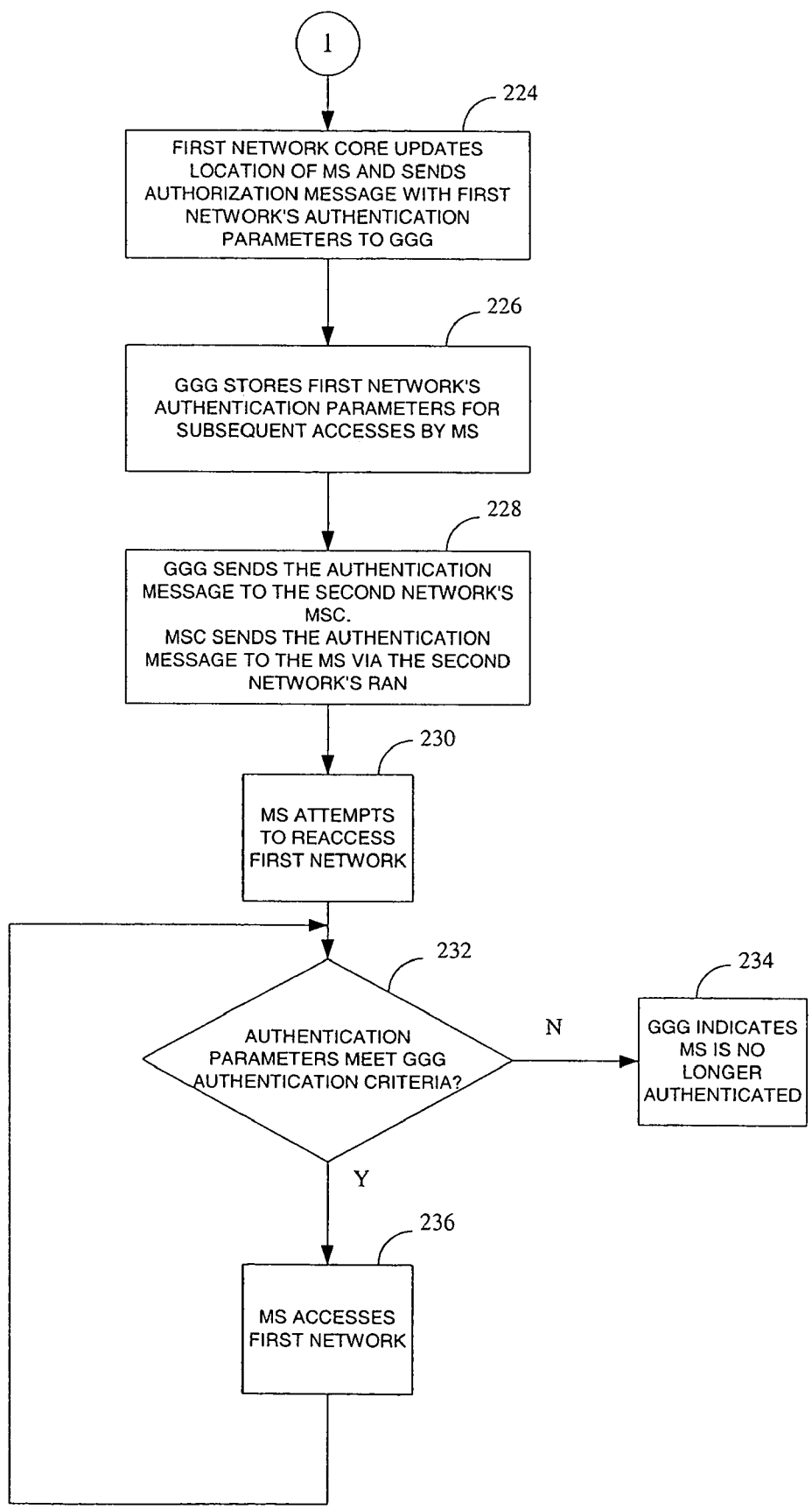

FIGS. 2a and 2b shows a flowchart for authenticating a CDMA mobile station 24 with a subscription in a GSM network 14 in accordance with an embodiment. In step 202, mobile station 24 (MS) roams into a CDMA area and the flow of control proceeds to step 204. In step 204, the mobile station 24 initiates a registration system access to a CDMA MSC 46 via a CDMA RAN 48 and the flow of control proceeds to step 206.

The registration system access is a message to the CDMA MSC 46 via the CDMA RAN 48, the message including an identity of the mobile station 24. In an embodiment, the identity of the mobile station 24 may be provided by the SIM 28. In an embodiment, the identity of the mobile station 24 is an IMSI. In an embodiment, the identity of the mobile station 24 is a Mobile Identification Number (MIN).

In step 206, the CDMA MSC 46 determines, based on the mobile station identity, whether the mobile station 24 is a GSM subscriber. In an embodiment, wherein the identity of the mobile station 24 is an IMSI, the MSC 46 can make this determination because the IMSI contains, among other information, a code representing the country and network in which the mobile station has a subscription.

In the event that the CDMA-subscribing mobile station 22 is the mobile station under test, the flow of control proceeds to step 208. In step 208, the mobile station 22 is authenticated using CDMA principles by the CDMA core infrastructure, using the CDMA HLR 42 and CDMA AUC 44.

In the event that the CDMA mobile station 24 with a subscription in the GSM network 14 is the mobile station under test, the flow of control proceeds to step 210. In step 210, the CDMA MSC 46 accesses the GGG 16 by sending an Authentication Request to the CDMA LR 52 in the GGG 16 and the flow of control proceeds to step 212 in accordance with an embodiment. In another embodiment, the flow of control proceeds to step 214.

In an embodiment, the identity of the mobile station 24 is sent to the CDMA LR 52 as part of the Authentication Request. Alternatively, the identity of the mobile station 24 is sent to the CDMA LR 52 in addition to the Authentication Request.

In an embodiment, the Authentication Request may include parameters MIN, ESN and COUNT. ESN is an electronic serial number. COUNT represents a count of a predetermined event that is a mutually agreed upon event between the GGG 16 and mobile station 24. Each time the predetermined event occurs, the mobile station 24 and the GGG 16 updates COUNT for the particular mobile station 24. In an embodiment, the GGG 16 shares the updating of COUNT with a node that interacts with the GGG 16. By sharing the update function with another node, the message traffic between the GGG 16 and the other node may be reduced. For example, if the GGG 16 shares the function of updating COUNT with the CDMA MSC 46, then the message traffic between the GGG 16 and the CDMA MSC 46 may be reduced.

In an embodiment, COUNT represents the number of times a mobile station 24 attempts to access the GSM network 14. Each time the mobile station 24 accesses the GSM network, the GGG updates a COUNT for the particular mobile station 24. The mobile station 24 also updates its own COUNT for the number of times it accesses the GSM network 14. The GGG 16 stores the value of the ESN. In another embodiment, COUNT represents a number of requests for authentication by the mobile station. It would be apparent to those skilled in the art that there are many events that can be counted, which the mobile station 24 and GGG 16 can count.

In step 212, the GGG 16 compares the value of COUNT to a count value in a GGG database. If the value of COUNT is equal to the count value in the GGG database, then the flow of control proceeds to step 214. If the value of COUNT is not equal to the count value in the GGG database, then the flow of control proceeds to step 216. It would be apparent to those skilled in the art that depending on an application, a variety of criteria may be applied to determine whether an Authentication Request is honored.

In step 214, an Authentication Request Return Result (ARRR) is set to true and the flow of control proceeds to step 218. The Authentication Request Return Result message indicates the result of the Authentication Request.

In step 216, the Authentication Request Return Result is set to false and the flow of control proceeds to step 220.

In response to the Authentication Request Return Result being true, the GGG 16 accesses the GSM network 14 and obtains necessary authentication information from the GSM HLR 34 and GSM AuC 36. In step 218, the GGG 16 looks up the MIN in its database to obtain a corresponding GSM IMSI and accesses the GSM network 14 by sending a GSM HLR authentication message with the IMSI of the mobile station 24 to the GSM HLR/AuC 34, 36, in accordance with an embodiment. The flow of control proceeds to step 220.

Method steps can be interchanged without departing from the scope of the invention. Thus, it would be apparent to those skilled in the art that step 218 does not have to be performed before step 220.

In step 220, the GGG 16 sends the Authentication Request Return Result to the CDMA MSC 46 and the flow of control proceeds to step 222. In step 222, the Authentication Request Return Result is tested. If the Authentication Request Return Result is true, then in step 224 the GGG 16 starts a timer, $T_{REG}$ and the flow of control proceeds to step 226.

If the Authentication Request Return Result is false, then the flow of control proceeds to step 228. In step 228., the CDMA MSC 46 sends a mobile station authentication message to the mobile station 24 indicating the mobile station 24 is not authenticated. It would be apparent to those skilled in the art that the mobile station may reattempt authentication depending on the application.

The GGG includes a logic unit (not shown) to execute program logic. It would be apparent to those skilled in the art that the logic unit may include a general purpose processor, a special-purpose processor, and/or firmware.

In step 226, the CDMA MSC 46 upon receiving an Authentication Request Return Result indicating successful authentication, sends a Registration Notification to the CDMA LR 52 in the GGG 16. The flow of control proceeds to step 230.

In step 230, a check is made to determine whether the GGG 16 received the Registration Notification before $T_{REG}$ expired. If the GGG 16 received the Registration Notification before $T_{REG}$ expired, then the flow of control proceeds to step 232, otherwise the flow of control proceeds to step 234. In step 232, Registration Notification Return Result is set to indicate $T_{REG}$ did not expire and the flow of control proceeds to step 236. In step 234, Registration Notification Return Result is set to indicate $T_{REG}$ expired and the flow of control proceeds to step 236.

In step 236, the GGG 16 responds to the Registration Notification with a Registration Notification Return Result indicating whether $T_{REG}$ expired. The Registration Notification Return Result is sent from the GGG 16 to the CDMA MSC 46.

In an embodiment, the GGG 16 sends a message with or within the Registration Notification Return Result indicating SMS only mode/status. "SMS only" means the mobile station 24 sends and receives only SMS messages, not data and/or voice messages. The flow of control proceeds to step 238.

In step 238, the CDMA MSC 46 sends a Registration Accept message to the mobile station 24 upon receiving the Registration Notification Return Result. Like the Registration Notification Return Result, the Registration Accept message indicates whether $T_{REG}$ expired. The flow of control proceeds to step 240.

In step 240, the mobile station 24 determines whether the Registration Accept message indicates an accepted registration, i.e., $T_{REG}$ did not expire. If $T_{REG}$ expired, then the flow of control proceeds to step 242, otherwise the flow of control proceeds to step 244.

In step 242, the mobile station 24 may or may not reattempt registration. It would be apparent to those skilled in the art that depending on a mobile station application, the mobile station may or may not reattempt registration.

Method steps can be interchanged without departing from the scope of the invention. Thus, it would be apparent to those skilled in the art that step 244 does not have to be performed after step 242.

Step 244 only has to be executed after the GSM HLR authentication message has been sent to the GSM BLR/AuC 34, 36 of step 218. In step 244, the GSM HLR/AuC 34, 36 sends a GGG authentication message including authentication parameters to the GGG 16 and the flow of control proceeds to step 246.

After the GGG 16 successfully sends the Registration Notification Return Result to the CDMA MSC 46 and receives the GGG authentication message from the GSM HLR/AuC 34, 36, the GGG 16 sends a GSM authentication request message to the CDMA MSC 46 in step 246. The flow of control proceeds to step 248. In step 248, the CDMA MSC 46 forwards the GSM authentication request message to the mobile station 24 and the flow of control proceeds to step 250.

In an embodiment, an application may have more criteria for authenticating mobile stations apart from the criteria applied to the original Authentication Request of step 210. Thus, in an embodiment, the CDMA MSC 46 sends a second authentication request (not shown) to the GGG 16 and the GGG 16 responds to the second authentication request (not shown).

In step 250, the mobile station 24 responds to the GSM authentication request message by determining authentication parameters such as an encryption key using a GSM authentication method and sending an authentication response including the authentication parameters to the CDMA MSC 46. In an embodiment, the authentication response is sent using the IS-637 SMS transport. The flow of control proceeds to step 252.

In step 252, the CDMA MSC 46 forwards the authentication response to the GGG 16 and the GGG 16 validates that the authentication parameters by matching the authentication parameters to values received from the GSM HLR/AuC 34, 36 in step 244. The flow of control proceeds to step 254.

In step 254, the GGG 16 sends an update location message to the GSM HLR 34 to update the location of the mobile station 24 and the flow of control proceeds to step 256. In step 256, the GSM HLR 34 sends GSM subscriber profile data of the mobile station 24 to the GSM LR 50 in the GGG 16. The flow of control proceeds to step 258.

In step 258, the GGG 16 maps the GSM subscriber profile data to a CDMA subscriber profile and sends the CMDA profile data in a Qualification Directive to the CDMA MSC 46 and the flow of control proceeds to step 260. The Qualification Directive indicates that the mobile station 24 is qualified, i.e., authorized to communicate with the GSM network 14. If the mobile station 24 is not qualified, then mobile station 24 is not authorized to communicate with the GSM network 14 (not shown). In an embodiment, the GGG 16 indicates to the CDMA MSC 46 "full profile," which in turn is forwarded to the mobile station 24 and indicates to the mobile station 24 that the mobile station 24 can send and receive without being limited to SMS messages.

In step 260, the CDMA MSC 46 responds to the Qualification Directive and sends a Qualification Directive Response to the CDMA LR 52 and the flow of control proceeds to step 262.

In step 262, responsive to the GSM LR 50 receiving the GSM subscriber profile data, the GGG 16 sends a GSM subscriber profile data response to the GSM HLIWAuC 34, 36.

In step 264, responsive to the GSM HLR 34 receiving the update location message from the GGG 16 in step 254, the GSM HLR 34 responds to the update location message and sends a update location message response to the GSM LR 50, the update location message response indicating that the location of the mobile station 24 has been updated at the GSM LR 50.

While the particular AUTHENTICATING BETWEEN A CDMA NETWORK AND A GSM NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

Method steps can be interchanged without departing from the scope of the invention.

The invention claimed is:

1. A general global gateway (GGG) comprising:
a database configured to store a number of times the mobile station has accessed the GGG, the GGG being configured to support communication between a GSM network and an unmodified CDMA network to enable a mobile station (MS) subscribed in the GSM network to communicate using the CDMA network; and
a logic unit configured to execute program logic to determine whether a parameter is received from the MS, the parameter representing a count of a predetermined event that is a mutually agreed upon event between the GGG and MS,
wherein, when the MS is a CDMA mobile station with a subscription in the GSM network, the GGG acts as an authentication controller in the unmodified CDMA network during registration of the MS but authenticates the MS using the GSM authentication mechanism; and
wherein the MS is placed in a short message service (SMS) only status during authentication.

2. The GGG of claim 1, wherein the count represents the number of times the MS has accessed the GGG and is equal to the stored number of times the MS has accessed the GGG.

3. The GGG of claim 1, wherein the logic unit is further configured to execute program logic to determine whether a registration notification from the MS was received before a GGG timer expires.

4. The GGG of claim 1, further comprising a timer that is used by the GGG to determine a period of time in which the MS is authorized to communicate with the GSM network.

5. The GGG of claim 1, further comprising a short message service center (SMSC)configured to send and receive SMS messages to and from the CDMA network.

6. The GGG of claim 1, further comprising a location register configured to store a location of the MS to enable a call incoming to the MS from the GSM network to route the incoming call to the MS through the GGG.

7. A general global gateway (GGG) configured to support communication between a GSM network and a CDMA network to enable a mobile station (MS) subscribed in the GSM network to communicate using the CDMA network, comprising:
means for storing a number of times the MS has accessed the GGG; and
means for executing program logic to determine whether a parameter received from the MS, the parameter representing the number of times the MS has accessed the GGG, is equal to the stored number of times the MS has accessed the GGG,
wherein, when the MS is a CDMA mobile station with a subscription in the GSM network, the GGG acts as an authentication controller in the unmodified CDMA network during registration of the MS but authenticates the MS using the GSM authentication mechanism; and
wherein the MS is placed in a short message service (SMS) only status during authentication.

8. The GGG of claim 7, wherein the logic unit is further configured to execute program logic to determine whether a registration notification from the MS was received before a GGG timer expires.

9. The GGG of claim 7, further comprising means for determining a period of time in which the MS is authorized to communicate with the GSM network.

10. The GGG of claim 7, further comprising means for sending and receiving short message service (SMS) messages to and from the CDMA network.

11. The GGG of claim 7, further comprising means for storing a location of the MS to enable a call incoming to the MS from the GSM network to route the incoming call to the MS through the GGG.

12. A method of wireless communications between a GSM network and a CDMA network to enable a mobile station (MS) subscribed in the GSM network to communicate using the CDMA network, comprising:
storing a number of times the MS has accessed a general global gateway (GGG); and
determining whether a parameter received from the MS, the parameter representing the number of times the MS has accessed the GGG, is equal to the stored number of times the MS has accessed the GGG.
wherein, when the MS is a CDMA mobile station with a subscription in the GSM network, the GGG acts as an authentication controller in the unmodified CDMA network during registration of the MS but authenticates the MS using the GSM authentication mechanism; and
wherein the MS is placed in a short message service (SMS) only status during authentication.

13. The method of claim 12, further comprising determining whether a registration notification from the MS was received before a GGG timer expires.

14. The method of claim 12, further comprising determining a period of time in which the MS is authorized to communicate with the GSM network.

15. The method of claim 12, further comprising sending and receiving short message service(SMS) messages to and from the CDMA network when in SMS only mode.

16. The method of claim 12, further comprising storing a location of the MS to enable a call incoming to the MS from the GSM network to route the incoming call to the MS through the GGG.

17. Computer readable media embodying a program of instructions executable by a computer program to perform a method of wireless communications between a GSM network and a CDMA network enabling a mobile station (MS) subscribed in the GSM network to communicate using the CDMA network, the method comprising:
storing a number of times the MS has accessed a general global gateway (GGG); and
determining whether a parameter received from the MS, the parameter representing the number of times the MS has accessed the GGG, is equal to the stored number of times the MS has accessed the GGG,
wherein, when the MS is a CDMA mobile station with a subscription in the GSM network, the GGG acts as an authentication controller in the unmodified CDMA network during registration of the MS but authenticates the MS using the GSM authentication mechanism; and wherein the MS is placed in a short message service (SMS) only status during authentication.

18. The computer readable media of claim 17, wherein the method further comprises:

storing an identity of the MS; and obtaining authentication information from the first network based on the identity of the MS if the parameter representing the number of times the MS has accessed the GGG is equal to the stored number of times the MS has accessed the GGG.

19. The GGG of claim 1, wherein the GGG enables a second mobile station subscribed in the CDMA network to communicate using the GSM network, and when the second mobile station is a GSM mobile station with a subscription in the CDMA network, the GGG acts as an authentication controller in the GSM network during registration of the second mobile station, but authenticates the second mobile station using the CDMA authentication mechanism.

20. The method of claim 12, wherein the method further enables a second mobile station subscribed in the CDMA network to communicate using the GSM network, and wherein, when the second mobile station is a GSM mobile station with a subscription in the CDMA network, the GGG acts as an authentication controller in the GSM network during registration of the second mobile station, but authenticates the second mobile station using the CDMA authentication mechanism.

* * * * *